(12) United States Patent
McFadden et al.

(10) Patent No.: US 10,966,570 B1
(45) Date of Patent: Apr. 6, 2021

(54) HIGH-EFFICIENCY HEATING APPARATUS

(71) Applicant: Hyper Fryer, LLC, North Richland Hills, TX (US)

(72) Inventors: David H. McFadden, Somerville, MA (US); David A. Bolton, North Richland Hills, TX (US)

(73) Assignee: Hyper Fryer, LLC, North Richland Hills, TX (US)

(*) Notice: Subject to any disclaimer, the term of this patent is extended or adjusted under 35 U.S.C. 154(b) by 0 days.

(21) Appl. No.: 16/891,868

(22) Filed: Jun. 3, 2020

(51) Int. Cl.
| | |
|---|---|
| *A47J 37/12* | (2006.01) |
| *F23D 14/10* | (2006.01) |
| *F23D 14/64* | (2006.01) |
| *F23C 5/08* | (2006.01) |
| *F23C 3/00* | (2006.01) |
| *F23D 23/00* | (2006.01) |
| *F24C 15/34* | (2006.01) |
| *A47J 36/32* | (2006.01) |
| *F23C 7/04* | (2006.01) |

(52) U.S. Cl.
CPC .......... *A47J 37/1247* (2013.01); *A47J 36/32* (2013.01); *F23C 3/00* (2013.01); *F23C 5/08* (2013.01); *F23C 7/04* (2013.01); *F23D 14/10* (2013.01); *F23D 14/64* (2013.01); *F23D 23/00* (2013.01); *F24C 15/34* (2013.01); *F23D 2900/00011* (2013.01)

(58) Field of Classification Search
None
See application file for complete search history.

(56) References Cited

U.S. PATENT DOCUMENTS

| | | | | |
|---|---|---|---|---|
| 3,977,390 | A * | 8/1976 | Fogel | A47J 37/1233 126/374.1 |
| 4,102,330 | A * | 7/1978 | Hutchinson | A47J 27/18 126/374.1 |
| 4,913,042 | A * | 4/1990 | Miller | A47J 37/1214 99/336 |
| 5,724,887 | A * | 3/1998 | Hakvoort | A47J 37/1247 126/392.1 |
| 6,178,964 | B1 * | 1/2001 | McFadden | A47J 37/1242 126/391.1 |
| 6,286,465 | B1 * | 9/2001 | Hughes | F23M 9/003 122/155.2 |
| 6,374,821 | B1 * | 4/2002 | Furuhashi | A47J 37/1247 126/376.1 |
| 7,690,375 | B2 * | 4/2010 | Ricord | F23C 5/02 126/91 A |
| 8,733,235 | B1 * | 5/2014 | Chipman | A47J 37/1219 99/339 |
| 9,585,517 | B1 * | 3/2017 | Piazza | A47J 37/1242 |
| 10,582,805 | B1 * | 3/2020 | Bourgeois | A47J 37/1247 |
| 2016/0262570 | A1 * | 9/2016 | Waylor | A23L 5/12 |
| 2018/0271326 | A1 * | 9/2018 | Buford | F23C 3/002 |
| 2018/0289217 | A1 * | 10/2018 | Stollenwerk | A47J 36/38 |
| 2019/0125131 | A1 * | 5/2019 | Denning | A47J 37/1247 |

* cited by examiner

*Primary Examiner* — David J Laux
(74) *Attorney, Agent, or Firm* — James E. Walton

(57) ABSTRACT

A high efficiency heating apparatus for heating fluids and cooking mediums, such as oil or shortening within a fryer, includes a natural draft (non powered) combustion chamber with internal baffles that is affixed to an exterior surface of a fry tank.

25 Claims, 8 Drawing Sheets

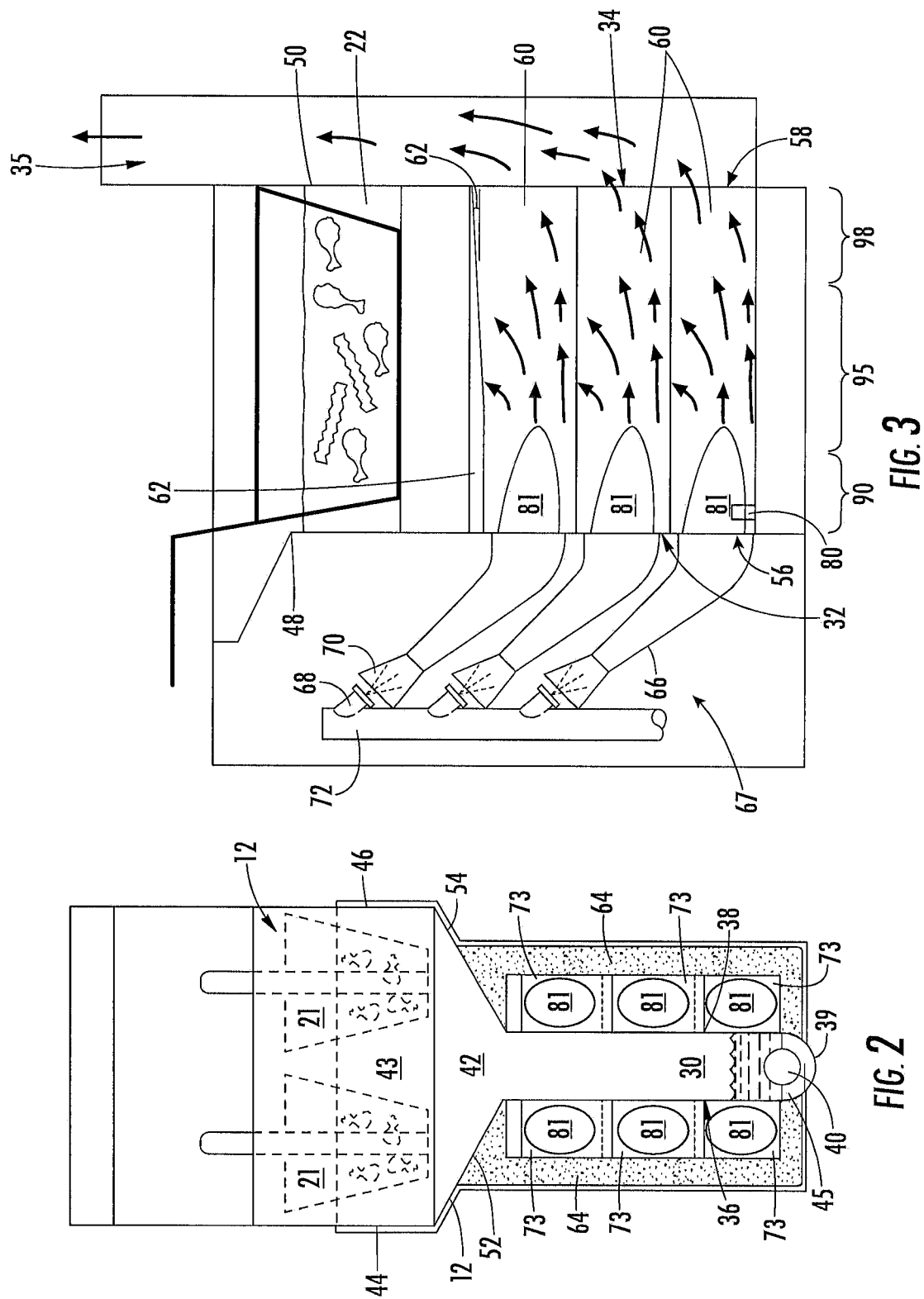

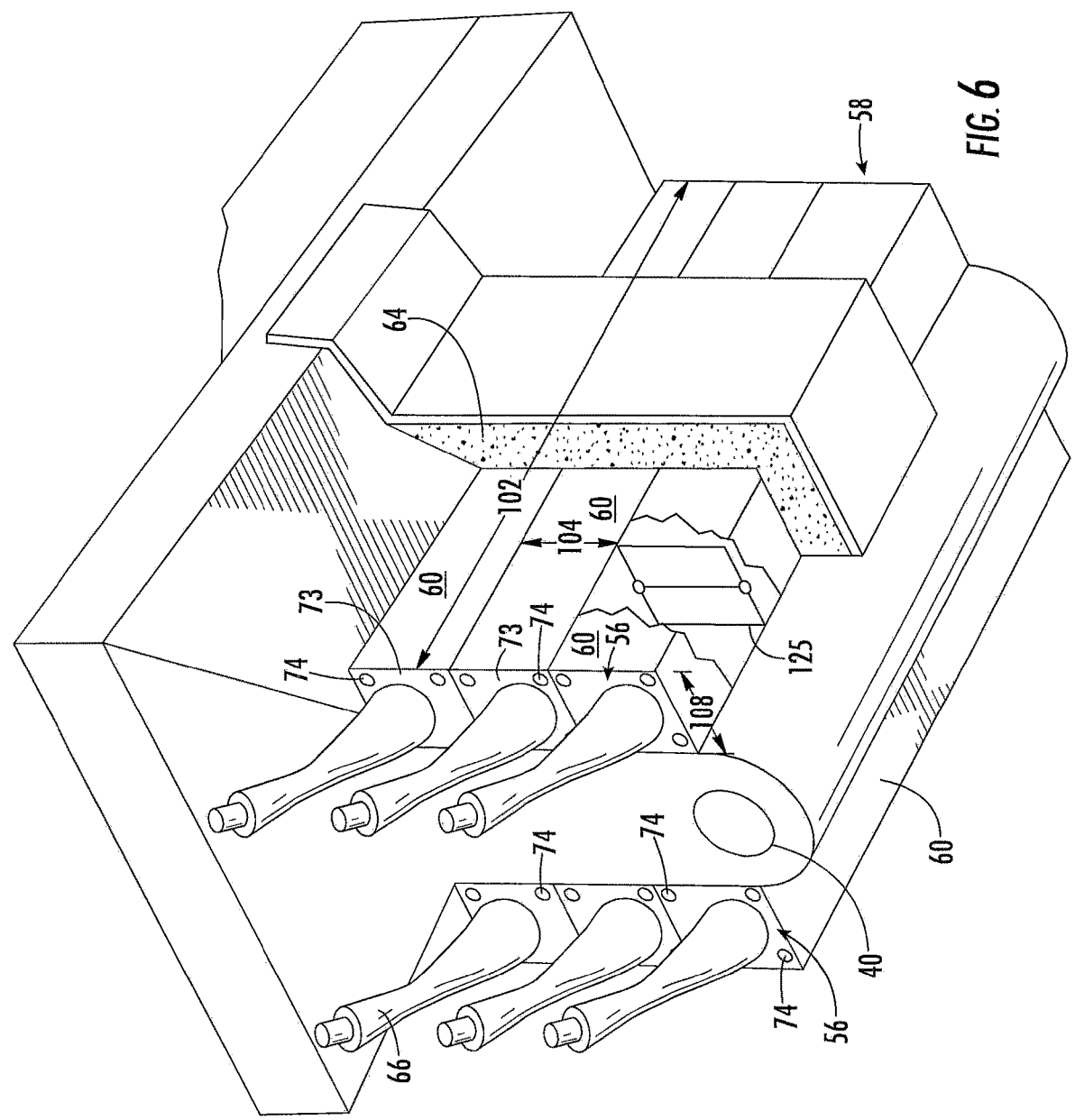

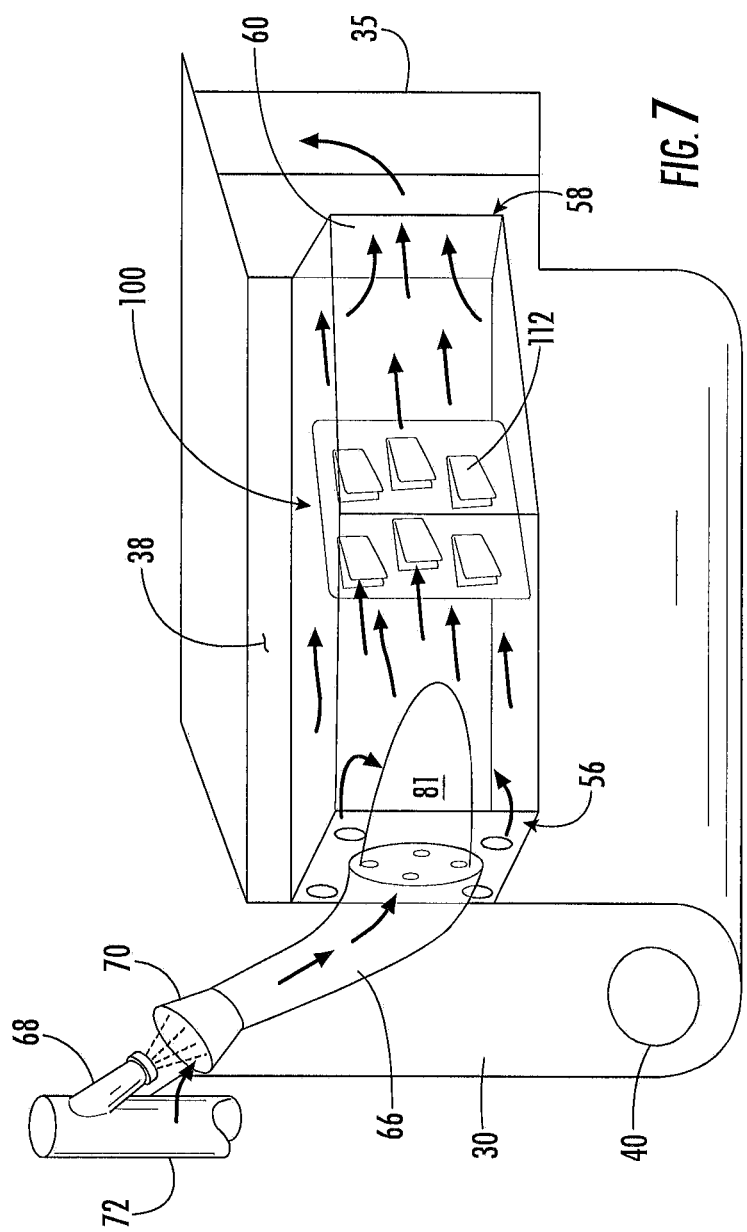

HIGH-EFFICIENCY HEATING APPARATUS

BACKGROUND

Field of the Invention

The present application relates to deep fryers. In particular, the present application relates to a natural draft combustion system for deep fryers.

Description of Related Art

There are millions of deep fryers in use throughout the world. They are found in almost every restaurant and commercial kitchen. Deep fryers are designed for quickly cooking deep-fried foods, including, but not limited to, French fries, chicken cutlets, fried vegetables, fried fish, fried ice cream, etc. Deep fryers generally include: (1) a cooking vessel or fry pot within which a cooking medium such as oil or shortening is heated to appropriate temperature for cooking; (2) a heat source, including gas, such as natural gas or propane, and electricity; (3) a control system for controlling the heat input to the cooking medium; and (4) a drain system for draining the cooking medium for either disposal or filtering and return to the cooking vessel. As with many commercial appliances, the size and shape, i.e., the footprint, of these deep fryers has been standardized to aid in their design, installation, maintenance, and replacement.

Gas powered deep fryers typically include tube and open tank designs. Tube fryers transfer heat to the oil contained within the cooking vessel via tubes that pass into, throughout, and then exit the cooking vessel. The combustion systems associated with tube fryers include natural draft kits, pulse combustion, and powered burners—both forced and induced draft. Depending on the combustion system and the heat transfer configuration of the tubes, the efficiency of tube fryers may range from approximately 30% efficiency to approximately 55+% efficiency.

However, tube fryers have several drawbacks. The heat exchange tubes reside in the cooking vessel causing cleaning and maintenance issues. Users must brush and clean around and under the tubes. Additionally, food products from the cooking process drop onto the hot tubes, burning and charring the food, thereby degrading the cooking oil. Lastly, the tubes and the walls of the cooking vessel experience thermal expansion, but at different rates. Because of this, cracks can develop in and around the welds where the tubes enter and exit the cooking vessel, as well as at other places, causing leaking and reliability/maintenance problems.

On the other hand, open tank fryers achieve heat or energy transfer from the combustion process through the side walls of the cooking vessel to the oil. The principal advantage of open tank fryers is that no heat exchange tubes pass through the cooking vessel and therefore do not reside within the cooking oil. Open tank fryers provide unobstructed access to the tank's interior making cleaning substantially easier, eliminating degradation of the cooking oil due to charring, and eliminating the reliability issues associated with broken welds. Open tank fryers are generally cheaper to manufacture and offer ease of cleaning and better/longer oil life as compared to tube fryers. Like tube fryers, the combustion systems of open tank fryers range from natural draft to powered types with similar efficiencies. Low-cost, conventional natural draft open tank fryers are generally about 30% efficient (low efficiency). High efficiency open tank fryers have efficiencies approaching 55%.

High efficiency tube and open tank fryers have drawbacks. The main drawback of high efficiency open tank fryers include the high cost to move hot combustion gas, due to the sophisticated controls, powered burners (featuring either forced draft combustion blowers or induced draft fans), and infrared burners, because these complex features add cost and contribute to reliability and maintenance issues. For high efficiency tube fryers, heat exchange designs have become much more intricate, using complex tube designs (longer tubes, bends, varying cross-section) or finned heat exchangers to extract more energy from the combustion gases.

Hence, there is a need for a highly efficient open tank fryer with a simple, reliable, and inexpensive natural draft combustion system that fits within the footprint of conventional deep fryers.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

FIG. 2 is a partial cross section of the deep fryer of FIG. 1 taken at II-II;

FIG. 3 is a partial cross section of the deep fryer of FIG. 1 taken at III-III;

FIG. 6 is an upward partial perspective view illustrating combustion chambers, burners, and insulation of the deep fryer of FIG. 1;

FIG. 7 is a side partial perspective view illustrating a tapered combustion chamber, a burner assembly, and baffles, according to the preferred embodiment of the deep fryer of the present application;

DETAILED DESCRIPTION OF THE PREFERRED EMBODIMENT

As used herein, the terms "fryer," "deep fryer," "deep-fat fryer," "tank fryer," "commercial floor fryer," and "floor fryer" have the same meaning and refer to cooking apparatus generally having four subsystems, including: (1) a cooking vessel or fry pot within which a cooking medium, such as oil or shortening, is heated to appropriate temperature for cooking, (2) a heat source, including gas, such as natural gas or propane, and electricity, (3) a control system for selectively controlling the heat input to the cooking medium, and (4) a drain system for use in draining the cooking medium for either disposal or filtering and return to the deep fryer. Also, as used herein, the terms "vessel," "cooking vessel," "open pot," and "fry pot" have the same meaning and refer to the reservoir in a deep fryer in which the cooking medium resides.

As used herein, the term "tube fryer" refers to a deep fryer having a cooking vessel that transfers heat into a cooking medium contained by the cooking vessel via combustion tubes that pass into, run through, and exit the cooking vessel. In contrast, as used herein, the term "open tank fryer" refers to a deep fryer in which heat or energy is transferred from the combustion process through the side walls of the cooking vessel to the cooking medium.

As used herein, the term "gas" refers to natural gas, propane, and all other petroleum-based and/or ignitable combustion sources. Thus, the term "gas" is not meant to be limiting but is inclusive of any appropriate combustion source. Also, as used herein, the terms "natural draft system" and "natural draft combustion system" have the same meaning and refer to systems in which the motive force to induce the flow of the combustion gasses is achieved via the natural pressure differential between the hot gasses and the surrounding atmospheric condition. The resulting buoyancy force is sufficient to transport the products of combustion through the combustion and heat exchange zones without requiring additional pressure or flow control sources, such as blowers or fans.

As used herein, the term "commercial" refers to all foodservice venues including, but not limited to, large chain operations and individual operators selling food product directly to the consumer.

The problems associated with conventional deep fryers, both open pot fryers and tube fryers, are solved by the principles and concepts embodied by the high efficiency heating apparatus of the present application.

Figure 1:
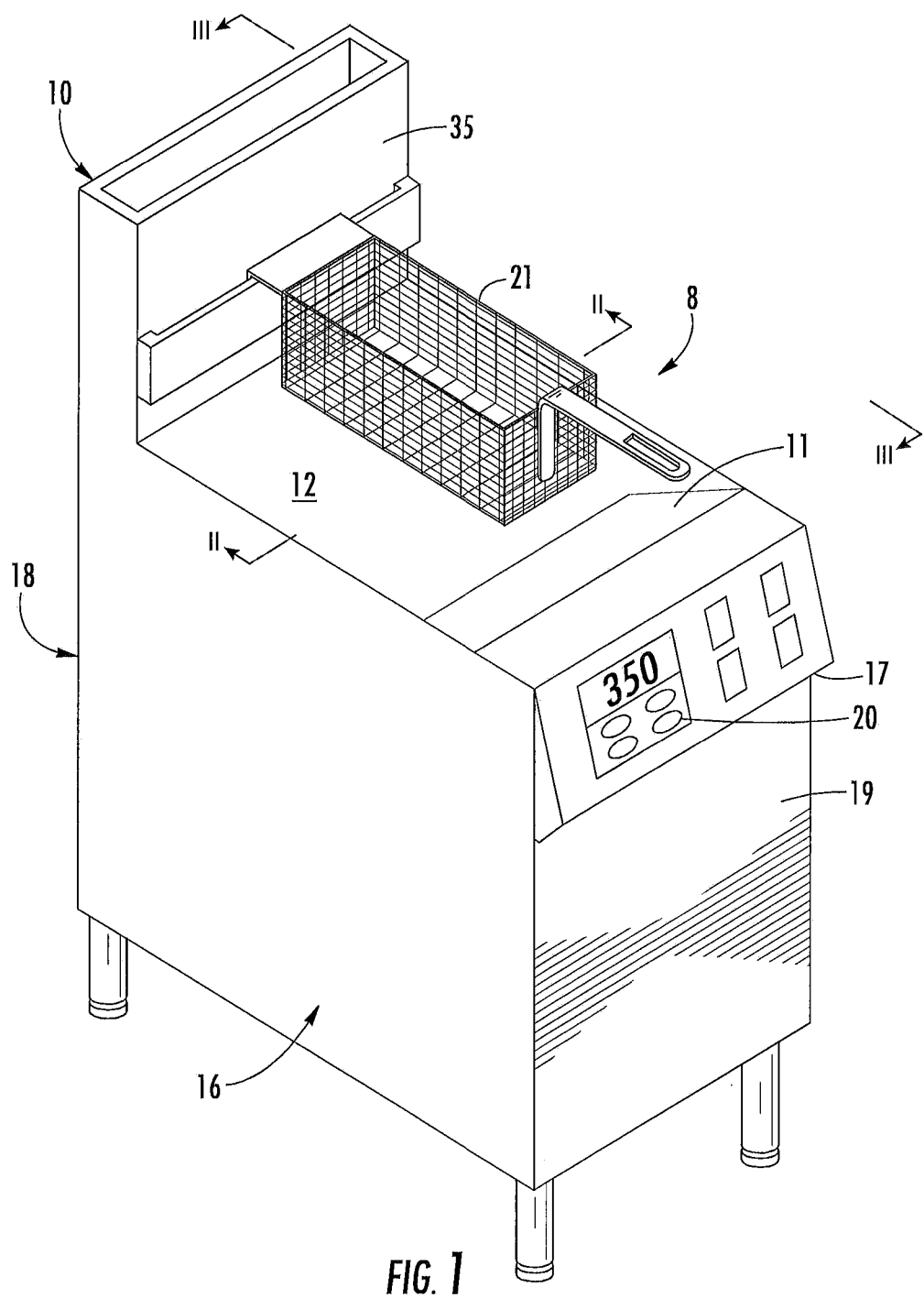
FIG. 1 is a perspective view of a deep fryer, according to the present application.

Referring to FIG. 1 in the drawings, an open tank, gas-combustion deep fryer 8 according to the present application is illustrated. Deep fryer 8 includes a rectangular metal housing 10 forming an enclosure for a fry tank 12. Housing 10 preferably includes a left sidewall 16, a right sidewall 17, a back wall 18, an angled shelf 11, and a front wall 19. Front wall 19 houses controls 20, and is preferably removable and/or hinged to allow access to control wiring and other apparatus within housing 10.

Deep fryer 8 is an open tank natural draft (non-powered) gas-combustion fryer. Deep fryer 8 is a high-efficiency, low-cost, heating apparatus for heating fluids and cooking mediums, such as oil or shortening. Deep fryer 8 is particularly well suited for commercial restaurant cooking, and for preparing deep-fried foods, including, but not limited to, French fries, fried ice cream, chicken cutlets, fried vegetables, fried fish, etc.

Although deep fryer 8 may be manufactured in any size, shape, and dimensions, dependent upon the desired use and application, in the preferred embodiment, deep fryer 8 does not increase the volumetric space requirements of conventional deep fryers. Thus, deep fryer 8 is preferably configured to fit within the same "footprint" as conventional deep fryers. As such, deep fryer 8 preferably utilizes between 35-50 pounds of cooking oil or other cooking medium. In a preferred embodiment, the input rate of the deep fryer 8 is 24.6 kW (or 84,000 Btu/hr). Alternatively, deep fryer 8 may be configured for industrial and automated applications.

Referring now also to FIGS. 2 and 3 in the drawings, fry tank 12 is sized to hold one or more baskets 21 and a cooking medium 22, such as oil or shortening. In the preferred embodiment, deep fryer 8 is a floor fryer, wherein fry tank 12 is configured to hold between 35-50 pounds of cooking medium 22, has a cooking volume of approximately 14 inches wide, by 14 inches long, and 6 inches deep. Preferably, the volume of fry tank 12 is used to hold two or more food product baskets 21.

Alternatively, deep fryer 8 may be configured as a low volume fryer (LVF). In the LVF embodiment, deep fryer 8 has a smaller excess oil capacity than the preferred embodiment. However, in the LVF embodiment, deep fryer 8 is configured with enough oil capacity for the desired cooking load, recovery time, and drag out (the oil consumed during cooking). The volume of fry tank 12 in the LVF embodiment is preferably capable of holding approximately less than or equal to 35 pounds of cooking medium 22. The reduction in oil capacity results in oil savings from reducing waste oil and oil life extension. The savings from the reduced oil and oil waste can be substantial.

Referring now also to FIGS. 2-6 in the drawings, fry tank 12 includes a lower chamber 30, a transition zone 42, and a cooking zone 43. Cooking zone 43 is in fluid connection with transition zone 42 and lower chamber 30. Lower chamber 30 is comprised of opposed front and back walls 32, 34, opposed left and right walls 36, 38, a bottom wall 39, and a large diameter oil drain 40. Preferably, front and back walls 32, 34 and left and right walls 36, 38 are substantially vertical and straight, while the bottom wall 39 is curved. However, slight variations in linearity, curvature, and orientation of the walls will be recognized as alternative embodiments and are encompassed in the present application.

Bottom wall 39 forms a cold zone 45 and is configured and dimensioned to allow quick and easy hand cleaning. Cold zone 45 is located below lower chamber 30 and is a relatively cool and quiescent zone compared to the bulk of the oil in the remainder of fry tank 12, which has a set point typically in the range of 325-375° F. Collection of food particles in cold zone 45 is desirable because charred food degrades the cooking oil, thereby reducing the life of the oil. In general, a larger cold zone 45 is preferred, especially for battered products, but practical design limitations such as overall tank volume, energy needs, and minimization of the oil volume used for the cooking process, requires this volume to remain small.

Transition zone 42 includes angled walls 52, 54. Cooking zone 43 includes opposed side walls 44, 46, which preferably are substantially vertical, a front wall 48, and a back wall 50. Left and right walls 36, 38 of lower chamber 30 are connected to respective side walls 44, 46 of cooking zone 43 by the respective angled walls 52, 54 of transition zone 42. The gas-combustion process results in heating of the cooking medium 22 and occurs primarily at sidewalls 36, 38 of lower chamber 30. Heated air and other by-products of the combustion process are in fluid contact with the outer surface of walls 36, 38 of lower chamber 30.

Deep fryer 8 is an open tank deep fryer having a natural draft (non-powered) gas-combustion system 67. Non-powered natural draft gas-combustion system 67 includes a gas supply conduit 72, at least one nozzle 68 in fluid communication with gas supply conduit 72, a jet 70 in fluid communication with nozzle 68, an angled burner 66 in fluid communication with jet 70, an inlet air plate 73 connected to angled burner 66, a combustion chamber 60 in fluid communication with burner 66, and an igniter 80. Burner 66 terminates at a burner face 75, which may be disposed just within combustion chamber 60 or disposed adjacent combustion chamber 60 in a manner that allows for a small separation between burner face 75 and combustion chamber 60. In either configuration burner 66 is in fluid communication with combustion chamber 60. It will be appreciated that in those embodiments of the present application in which multiple combustion chambers 60 and multiple burners 66 are employed, gas supply conduit 72 may serve as a manifold for distributing gas between the multiple combustion chambers 60 and burners 66.

Gas is supplied to gas supply conduit 72 and thereafter flows through nozzles 68 to gas jets 70, where the gas mixes with air and thereafter flows down angled burners 66 to inlet air plates 73 and igniter 80. Igniter 80 causes the pre-mixed gas to combust, producing a selectively angled flame front 81. To aid with complete combustion, secondary air is introduced into the combustion process through secondary air openings 74 in inlet air plate 73. Preferably, deep fryer 8 includes one manifold 72 on each side of lower chamber 30, with each manifold 72 servicing three nozzles 68, three jets 70, three burners 66, three air inlet plates 73, and three combustion chambers 60.

In the preferred embodiment, lower chamber 30 has left and right walls 36, 38 dimensioned at approximately 1.0-1.5 ft$^2$, resulting in a total side heat transfer area of two to three square feet. The required heat input to left and right walls 36, 38 is achieved by both convection and radiation from combustion system 67, with radiation providing approximately one-third of the total heat transfer, and convection providing the remaining heat transfer. Each of left and right walls 36, 38 transfers between about 5 kW to 9 kW (or 20,000 to 30,000 Btu per hour) to the cooking oil under heavy cooking conditions.

To further optimize heat transfer, the exterior walls of each combustion chamber 60 are covered with one or more layers of high temperature insulating material 64. Insulating material 64 has low thermal capacitance and high heat transfer resistance, but is nevertheless compact to fit within the footprint of deep fryer 8. Preferably, the thermal profile of each combustion chamber 60 is maintained using insulating material 64, so that each combustion chamber 60 does not revert to the mean wall temperature of lower chamber 30. Reverting to the mean wall temperature of lower chamber 30 greatly reduces radiation to fry tank 12 given the quadratic heat transfer relationship of temperature (e.g., $q''(W/m^2) = \varepsilon\sigma(T_s^4 - T_{sur}^4)$).

Figure 4:
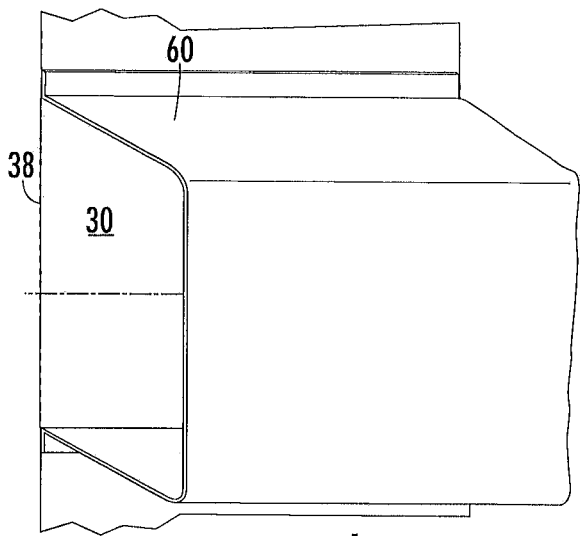
FIG. 4 is a partial perspective view showing a right sidewall and one combustion chamber of the deep fryer of FIG. 1.

Referring now specifically to FIG. 4 in the drawings, one possible assembly method for combustion chamber 60 is illustrated. Combustion chambers 60 are affixed to left and right walls 36, 38 of lower chamber 30. Each combustion chamber 60 extends substantially horizontally from front wall 32 to back wall 34, having an inlet portion 56 and an outlet portion 58. Each combustion chamber 60 is preferably a C-shaped rectangular enclosure attached to either left wall 36 or right wall 38 of lower chamber 30. By way of example, if only one combustion chamber 60 is utilized, combustion chamber 60 will be a three-sided C-shaped enclosure with either left wall 36 or right wall 38 forming the fourth side when combustion chamber 60 is affixed thereto. In the event multiple combustion chambers 60 are utilized on each side of fry tank 12, each combustion chamber 60 will have three interior surfaces with the fourth side formed by the aforementioned left and right walls 36, 38. Various manufacturing processes may be employed and as such multiple chambers may share an interior wall. The rectangular combustion chamber 60 is sealed, except at the inlet and outlet, such that hot gas flowing through each combustion chamber 60 is confined within such combustion chamber 60. Additionally, various configurations may be utilized in addition to the C-shaped configuration. For example, combustion chamber 60 may be configured as a semicircle or semi-ellipse shaped chamber with the open portion affixed to left or right wall 36, 38.

Each outlet portion 58 of chamber 60 is in fluid communication with an exhaust conduit, or flue 35 (see FIGS. 1 and 3). In the preferred embodiment, six combustion chambers 60 are affixed to lower chamber 30, with three combustion chambers 60 on each of left and right walls 36, 38. This description is meant to be illustrative and not limiting, as deep fryer 8 may be practiced with more or less than six combustion chambers 60. For example, with the LVF embodiment, fewer and/or smaller combustion chambers 60 may be utilized.

For higher temperature operation and quick response, each combustion chamber 60 is preferably made of a thin-walled, high-temperature metal such as Inconel®, which is both durable and cost effective. Alternatively, cast ceramic enclosures, or a segmented high-temperature metal liner are also options. Preferably, the height of each combustion chamber 60 is approximately two inches, causing tight radiation coupling between left and right walls 36, 38 of fry tank 12 and combustion chamber 60. However, other heights, including one, three, four, five inches, and more are also encompassed by the present application. The high-temperature insulating material 64 surrounding combustion chambers 60 maintains the primary heat transfer zone in excess of 1,000° F. Preferably, insulation material 64 comprises a high-temperature aerogel insulation that minimizes heat loss to the surrounding areas and maintains the outer walls of combustion chambers 60 at the high temperature required for a desired radiative heat transfer between combustion chambers 60 and left and right walls 36, 38.

Figure 5A:
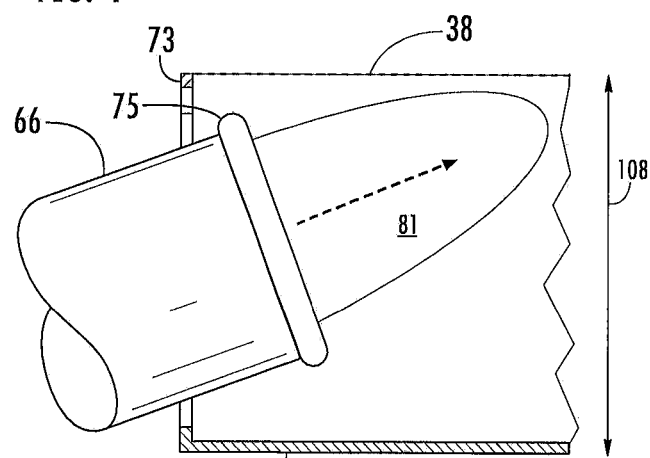
FIG. 5A is a partial cross section (as seen from above) of a burner assembly and a flame front of the deep fryer of FIG. 1.
Figure 5B:
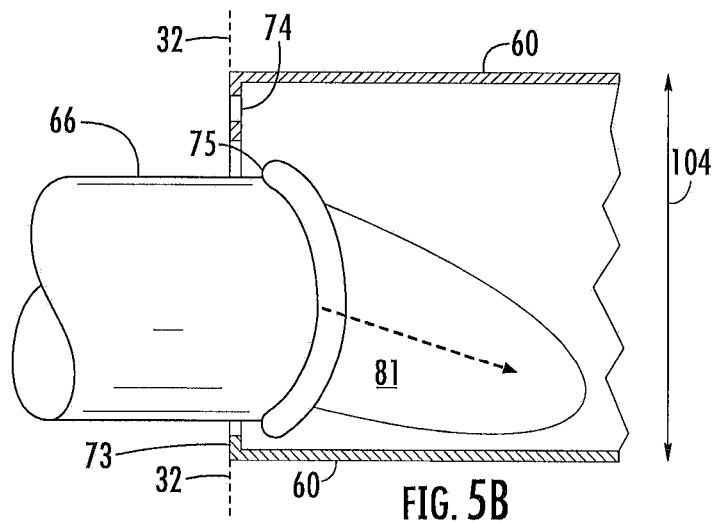
FIG. 5B is a partial cross section (as seen from the right side) of a burner assembly and a flame front of the deep fryer of FIG. 1.

Referring now specifically to FIGS. 5A and 5B in the drawings, the unique configuration and function of angled burners 66, burner faces 75, and flame front 81 are depicted. In the preferred embodiment, each burner face 75 has an area of approximately one-inch wide by three-inches high and a firing rate of approximately 3 kW to 5 kW (or 12,000 to 14,000 Btu/hr), with a combustion heat release volume that is in excess of 50 in$^3$. Preferably, each nozzle 68 is operated at a pressure of 3.5 inches water column, enabling each nozzle 68 to entrain 50-60% of the primary air. Preferably, the length of the body of each burner 66 is six to seven inches, allowing for good mixture of fuel flow and primary air. Due to the amount of primary air entrained, a relatively compact primary flame is produced with secondary air introduced around the perimeter of the burner face 75. Preferably, secondary inlet air plate 73 controls the amount of secondary air introduced to the flame. Preferably, pre-mixed gas and air is introduced into burner 66 and ignited by ignition source 80. Thereafter, secondary air introduced to burner 66 through secondary air openings 74 allowing complete combustion.

Burner 66 is configured with a downward directed angle allowing the primary air/gas mixture to flow down burner 66 to the substantially vertical burner face 75 and thereafter contact the bottom wall of combustion chamber 60 at a downward directed angle (see FIG. 5B). This downward angle of flame front 81 is generally due to the momentum of the gas flow. This unique selective angling of flame front 81 helps combustion chamber 60 remain as hot as possible, while maintaining a maximum temperature profile. The downward directed angle of burner 66, and the resulting downward directed flame front 81 causes greater contact of the flow of the hot combustion gasses with the bottom of combustion chamber 60, resulting in a longer residence time and thereby enhancing heat transfer to the cooking medium 22.

Convection and radiation from the products of combustion provide the heat transfer to left and right walls 36, 38 of lower chamber 30. As used herein, the "burner tilt angle" is defined as the included angle between a normal vector from burner face 75 to the surface (e.g., vertically disposed, side surface) of left and right walls 36, 38 adjacent to burner face 75. A burner tilt angle of zero degrees indicates that the combustion process is occurring parallel to walls 36, 38. For a burner tilt angle greater than zero degrees, flame front 81 is in close contact with right and left walls 36, 38.

Ignited combustion gas is directed toward left and right walls 36, 38 via burner 66 at a burner tilt angle of greater than zero degrees shown in top view FIG. 5A. Burner 66 is tilted according to a selected burner tilt angle towards walls 36, 38, such that hot gas from a turbulent combustion process is in close contact with left and right walls 36, 38. Flame front 81 for burner tilt angles between 5° and 15° can achieve complete combustion and also "adhere" to left and right walls 36, 38, producing higher convective heat transfer rates. FIG. 5A illustrates a burner tilt angle greater than zero degrees.

Referring again to FIG. 3, the combustion chamber 60 is biased upward from a horizontal axis at a draft angle 62. The upward draft angle is greater than zero degrees from the horizontal axis and promotes efficient combustion during start-up conditions when flue 35 is relatively cold. Draft angle 62 enables a small positive draft and promotes the flow of the hot gases by increasing the buoyancy effect. Although a draft angle greater than zero degrees and less than 15 degrees is preferred, because these angles promote a small positive draft, draft angles greater than 15 degrees may be utilized.

Combustion chamber 60 has three separate zones or areas: a combustion zone 90, a first heat transfer zone 95, and a second heat transfer zone 98. Combustion zone 90 provides sufficient volume for primary and secondary gas combustion. Burner 66 is a partially premixed burner, using less than 100% stoichiometric air. Thus, the primary combustion air is mixed with a gaseous fuel upstream of combustion zone 90. In burner 66, primary air levels set the rate of combustion and therefore define the general combustion volume and shape. To drive the combustion reaction to completion for burner 66, additional secondary air is introduced into the combustion volume. In general, secondary air is supplied to the combustion process in amounts exceeding 100-150% of stoichiometric requirements.

The combustion process is accomplished via flame front 81 having a short compact flame from burner 66, with a majority of the combustion process accomplished in combustion zone 90 within the first approximately 20% of the length of the combustion chamber 60. This permits maximum contact of the hot gasses to walls 36, 38. The combustion zone is the volume within combustion chamber 60 associated with the combustion gas. The size and shape of the combustion zone are determined by the fuel input rate, primary air levels, secondary air levels, and mixing efficiency.

Only a portion of the total convection heat exchange occurs within combustion zone 90. Directed gas from the combustion zone 90 next enters first heat transfer zone 95. First heat transfer zone 95 is approximately 50-60% of the length of combustion chamber 60. One or more baffle systems 100 (see FIGS. 7, 8A, and 8B) direct hot gas flow around, through, and towards left and right walls 36, 38. Baffle systems 100 are a high temperature component, generally made of metal, and are heated to red to white hot by the combustion gas flow producing both convection and radiation heating to left and right walls 36, 38. Various baffle configurations may be employed to accomplish hot gas flow to left and right walls 36, 38. Baffle systems 100 are located just beyond combustion zone 90, approximately midway through combustion chamber 60, and are designed so that baffle systems 100 do not inhibit the combustion process. Hot gas flow directed by baffle systems 100 operates at temperatures in excess of 1,100° F.

Figure 8A:
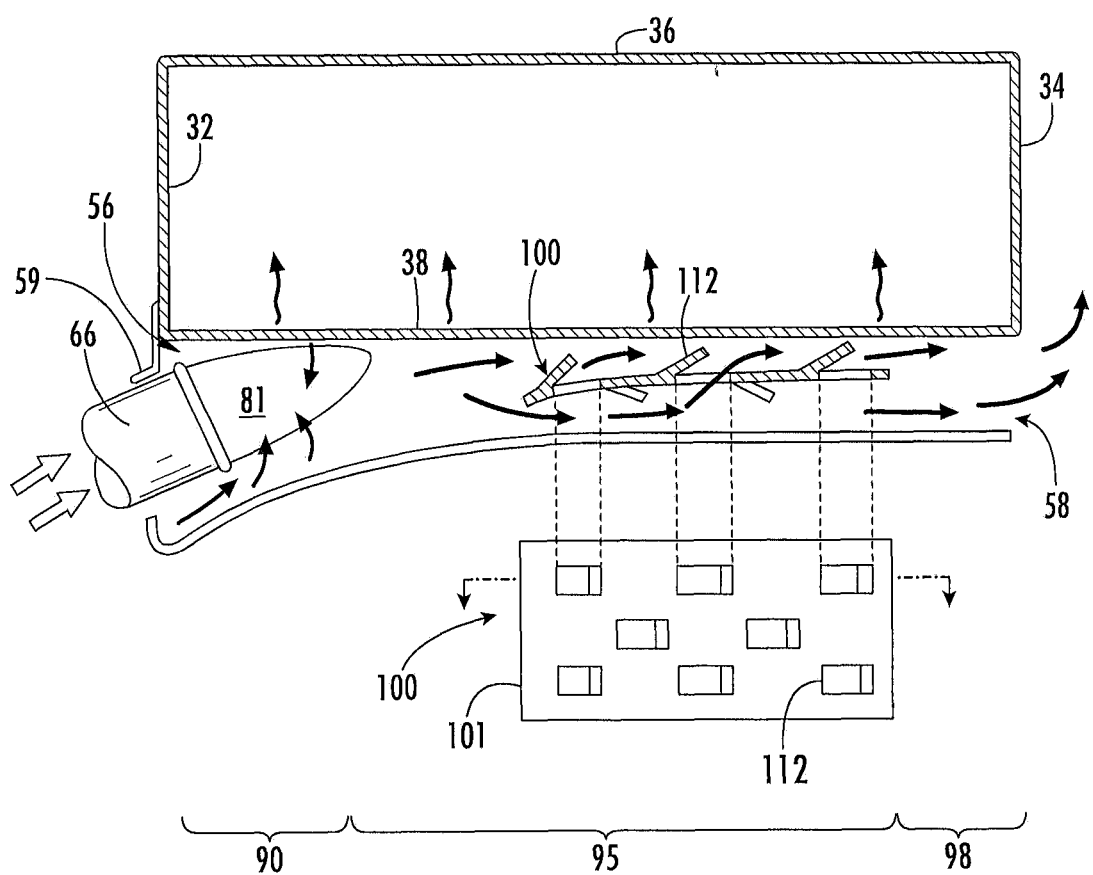
FIG. 8A is a partial cross section (as seen from above) illustrating a radially tapered combustion chamber, a burner, a flame front, and baffles, according to an alternative embodiment of the deep fryer of the present application.
Figure 8B:
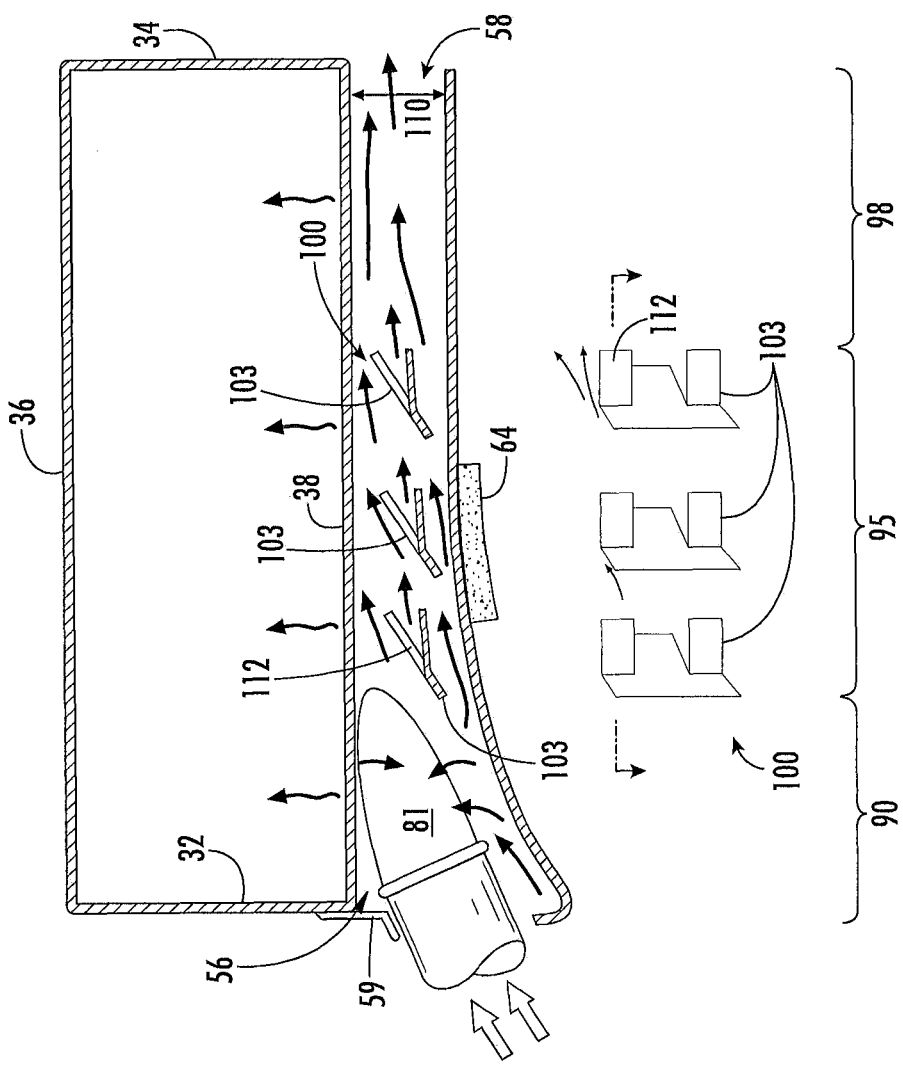
FIG. 8B is a partial cross section (as seen from above) illustrating a radially tapered combustion chamber, a burner, a flame front, and alternate flow tabs or vanes, according to another alternative embodiment of the deep fryer of the present application.

FIGS. 8A and 8B present two such illustrative baffle designs. The baffle configurations are tightly coupled to enclosure geometry, flame and/or combustion characteristics, and burner angle. To "grab" and direct gas flow in a low loss manner, baffle systems 100 preferably use a series of flow tabs or vanes 112. Vanes 112 are positioned to both route the hot gases through baffle systems 100 as well as direct portions of the flow toward left and right walls 36, 38. Baffle systems 100 operate in a hot portion of the gas flow and will approach the gas flow temperature and act as a very effective radiation source to fry tank 12. Baffle systems 100 may be configured from a single sheet of material 101, as shown schematically in FIG. 8A, or may be configured from separate individual sheets of material 103, as show schematically in FIG. 8B.

Combustion gas that flows through combustion chamber 60 begins to cool as it passes baffle system 100 with the combustion chamber wall temperature profile decreasing from approximately 1,100° F., or more, to approximately 550° F., or more, prior to outlet portion 58. The tapering of the combustion chamber 60 (see FIG. 7) reduces the cross section of combustion chamber 60 and forces the hot outer wall of combustion chamber 60 closer to left and right walls 36, 38, thereby increasing heat transfer coupling. The spent gas then exits combustion chamber 60 and enters flue 35. Without tapering, the velocity of combustion gasses decreases over the length of combustion chamber 60. A combustion chamber with a constant cross-sectional area will experience an undesirable reduction in local convective heat transfer with cooling flows. The increase in local flow densities with gas cooling and the resulting decrease in bulk flow velocity results in lower local heat transfer. Tapering combustion chamber 60 increases local flow velocities, improving the local convective heat transfer coefficient.

Burner 66 may be held in place by an indexing tab 59. As shown in FIGS. 8A and 8B in the drawings, the tapering of combustion chamber 60 in these embodiments is curved. Convection heat exchange occurs in combustion zone 90 of combustion chamber 60, radiant and convection heat exchange occurs in first heat transfer zone 95, and heat transfer in the form of convection occurs in second heat transfer zone 98. As is shown, combustion zone 90 is approximately 20% of the length of combustion chamber 60, first heat transfer zone 95 is approximately 50-60% of combustion chamber 60, and second heat transfer zone 98 is approximately 20-30% of the length of combustion chamber 60. Spent gas exits combustion chamber via outlet portion 58 and into flue 35. Flue 35 is the collection point for hot gas leaving combustion chamber(s) 60 and exhausts spent gas from deep fryer 8 to atmospheric venting. Although a majority to nearly all the heat transfer to fry tank 12 occurs within combustion chamber 60, a small amount of beneficial heat transfer occurs between lower chamber 30, back wall 34, and flue 35.

Referring now also to FIGS. 6, 7, 8A, and 8B, alternative configurations for combustion chamber 60 are illustrated, both externally (FIGS. 7, 8A, 8B) and non-externally (FIG. 6) tapered embodiments. Combustion chamber 60 preferably has a length 102 of approximately 12-14 inches, a height 104 of approximately 1-1.5 inches, and a width (for tapered embodiments shown in FIGS. 7, 8A and 8B), 108 of approximately 2 inches, where the width dimension is relative to the combustion chamber width at inlet portion 56. For externally tapered embodiments, the width 108 tapers to approximately 1-1.5 inches at outlet portion 58.

Various methods of tapering or reducing combustion chamber 60 volume may be utilized. For example, a radial tapering (see FIGS. 8A and 8B), an angled tapering (see FIG. 7), or combinations thereof may be used to taper combustion chamber 60. While the described examples are provided for illustrative purposes, other tapering methods may be employed and are encompassed by the present application. For example, an adjustable or fixed deflector 125 may be installed within, or at least partially within, combustion chamber 60, thereby reducing the volume of chamber 60. Adjustable deflector 125 (see FIG. 6) may be coupled with the control system of deep fryer 8 and may be configured to open or close depending upon performance desires and/or programming. Alternatively, deflector 125 may be manually controlled. Although combustion chamber 60 of FIG. 6, i.e., having a constant cross-sectional area, functions well, the angled tapered combustion chamber 60 of FIG. 7, i.e., having a selectively reduced cross-sectional area, is preferred for deep fryer 8. The pressure available due to tapering is not overly restrictive and does not choke or reduce the secondary air flow.

The natural draft combustion system of the present application provides significant advantages including, but not limited to: 1) elimination of heat exchange tubes passing through a fry tank; 2) elimination of reliability and maintenance issues associated with tubes in a fryer; and 3) elimination of expensive control systems, blower fans, and other means required in existing powered high efficiency open pot fryers.

Figure 9:
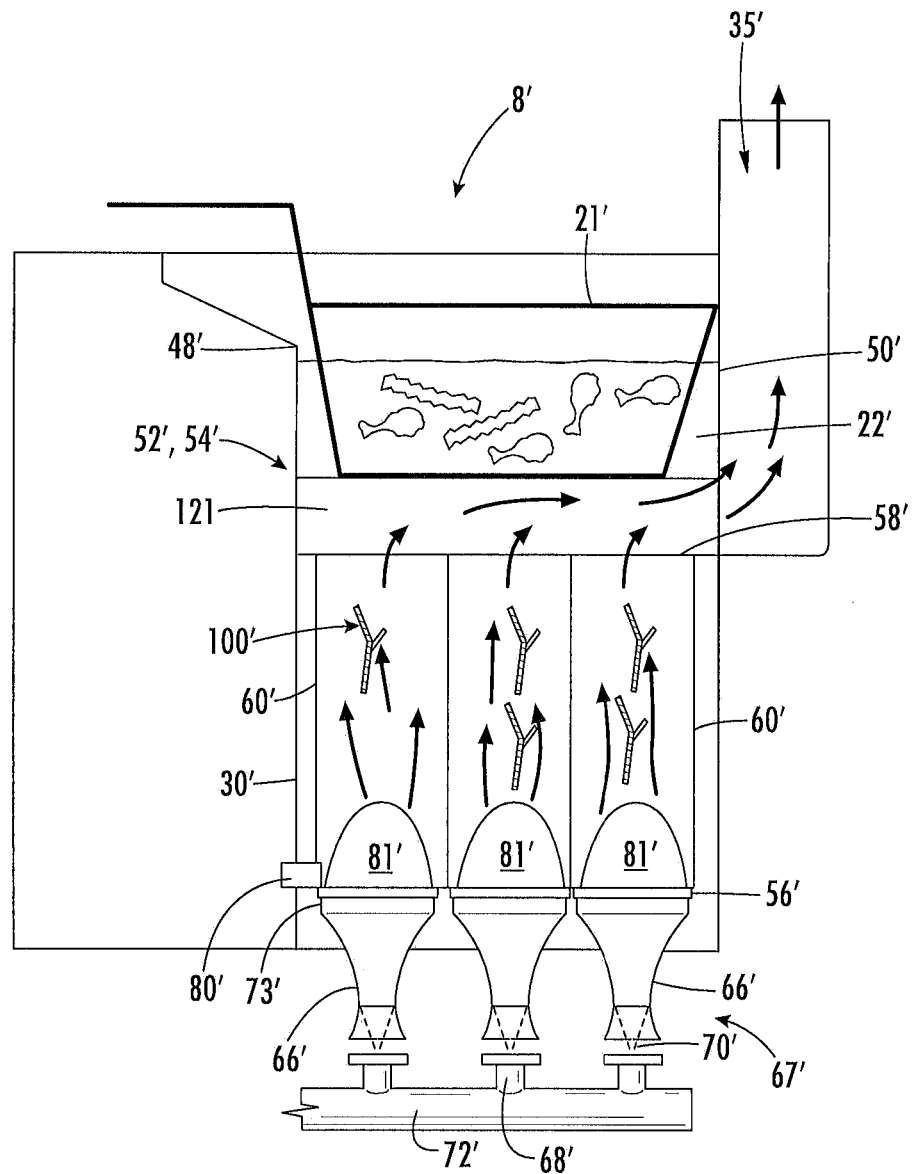
FIG. 9 is a partial cross section (as seen from the right side) of an alternative embodiment of the deep fryer of the present application.

Referring now to FIG. 9 in the drawings, an alternative embodiment of a deep fryer 8' according to the present application is illustrated. In this embodiment, combustion chambers 60' are generally vertically oriented between a front wall 48' and a back wall 50'. Deep fryer 8' includes a fry tank 12' that is sized to hold one or more baskets 21' and a cooking medium 22', such as oil or shortening. Deep fryer 8' is a floor fryer, wherein fry tank 12' is configured to hold between 35-50 pounds of cooking medium 22', has a cooking volume of approximately 14 inches wide, by 14 inches long, and 6 inches deep. Preferably, the volume of fry tank 12' is used to hold two or more food product baskets 21'.

Deep fryer 8' is an open tank deep fryer having a natural draft (non-powered) gas-combustion system 67'. Non-powered natural draft gas-combustion system 67' includes a gas supply conduit 72', at least one nozzle 68' in fluid communication with gas supply conduit 72', a jet or pump 70' in fluid communication with nozzle 68', a generally vertical burner 66' in fluid communication with jet 70', an inlet air plate 73' connected to burner 66', a combustion chamber 60' in fluid communication with burner 66', and an igniter 80'. Burner 66' terminates at a burner face that is disposed just within combustion chamber 60' or disposed adjacent combustion chamber 60' in a manner that allows for a small separation between burner face 75' and combustion chamber 60'. In either configuration, burner 66' is in fluid communication with combustion chamber 60'. Gas is supplied to gas supply conduit 72' and thereafter flows through nozzle 68' to gas jet 70', where the gas mixes with air and thereafter flows up burner 66' to inlet air plate 73' and igniter 80'. Igniter 80' causes the pre-mixed gas to combust, producing a generally vertical flame front 81'. To aid with complete combustion, secondary air is introduced into the combustion process through secondary air openings in inlet air plates 73'. Preferably, deep fryer 8' includes one manifold 72' on each side of a lower chamber 30', with each manifold 72' servicing three nozzles 68', three jets 70', three burners 66', three inlet air plates 73', and three combustion chambers 60'.

Hot combustion gas moves through combustion chambers 60', interacts with baffle systems 100' and may be affected by tapering or deflecting as previously described, before rising and collecting in horizontal collection chamber 121 which is in fluid connection with a flue 35'. Alternatively, combustion chambers 60' may be configured as narrow channels without tapering and/or deflecting because the motive force necessary to move the hot gasses through chambers 60' and into collection chamber 21 is accomplished due to the natural vertical assent of the hot gasses (hot air rising). Collection chamber 121 is affixed to transition walls 52', 54'. Although combustion gas entering collection chamber 121 is cooling, it may nevertheless provide secondary heat directly to transition walls 52', 54'.

It is apparent that an invention with significant advantages has been described and illustrated. Although the present application is shown in a limited number of forms, it is not limited to just these forms, but is amenable to various changes and modifications without departing from the spirit thereof.

What is claimed is:
1. A deep fryer, comprising:
    a cooking vessel for holding a cooking medium; and
    a natural draft combustion system comprising:
        at least one supply conduit for receiving and distributing a combustion gas;
        at least one burner in fluid communication with the at least one supply conduit;
        a combustion chamber in fluid communication with the at least one burner, the combustion chamber being exterior to the cooking vessel, being connected to an exterior surface of the cooking vessel, and being in heat transfer communication with the exterior surface of the cooking vessel;
        a baffle system disposed within the combustion chamber; and
        at least one deflector disposed at least partially within the combustion chamber to adjustably increase or decrease the volume of the combustion chamber when the deflector is opened or closed.

2. The deep fryer of claim 1, wherein the at least one burner extends from the gas supply conduit in a generally downward direction at a selected angle to the vertical, and then is angled to a generally horizontal orientation prior to entering the combustion chamber.

3. The deep fryer of claim 1, wherein the burner is angled inwardly toward the exterior surface of the cooking vessel.

4. The deep fryer of claim 1, wherein the combustion chamber extends in a generally horizontal direction.

5. The deep fryer of claim 4, wherein the combustion chamber has an upward draft angle relative to the horizontal from an inlet portion to an outlet portion.

6. The deep fryer of claim 1, wherein the combustion chamber is tapered inwardly from an inlet portion to an outlet portion.

7. The deep fryer of claim 6, wherein the inward taper is angled and linear.

8. The deep fryer of claim 6, wherein the inward taper is curved.

9. The deep fryer of claim 1, wherein the natural draft combustion system further comprises:
at least one nozzle in fluid communication with the at least one supply conduit; and
a jet in fluid communication with each nozzle, the jet being coupled to the at least one burner;
whereby the combustion gas is distributed from the supply conduit, through the at least one nozzle, into the jet, and into the at least one burner.

10. The deep fryer of claim 9, where the combustion gas is premixed with air between the nozzle and the jet.

11. The deep fryer of claim 10, further comprising:
a secondary air inlet plate operably associated with the burner; and
at least one secondary air opening in the secondary air inlet plate for allowing additional air to be mixed with the premixed gas.

12. The deep fryer of claim 1, wherein the at least one baffle system comprises:
a plurality of vanes selectively positioned to route the combustion gas though the baffle system and to direct portions of the combustion gas toward the exterior surface of the cooking vessel.

13. The deep fryer of claim 1, wherein the deflector is manually controlled.

14. The deep fryer of claim 1, wherein the deflector is automatically controlled.

15. The deep fryer of claim 1, wherein the combustion chamber extends in a generally vertical direction.

16. The deep fryer of claim 1, further comprising:
an insulating material disposed around an exterior surface of the combustion chamber for reducing heat loss from within the combustion chamber.

17. The deep fryer of claim 1, wherein the at least one supply conduit comprises:
one manifold on each side of the cooking vessel; and
wherein the at least one burner comprises:
multiple burners on each side of the cooking vessel, each burner being in fluid communication with a separate combustion chamber.

18. A method of manufacturing a deep fryer, comprising:
providing a cooking vessel for holding a cooking medium;
coupling a natural draft combustion system to the cooking vessel, the natural draft combustion system being formed by:
providing at least one supply conduit for receiving and distributing a combustion gas;
placing at least one burner in fluid communication with the at least one supply conduit;
connecting at least one combustion chamber along an exterior surface of the cooking vessel, such that the at least one combustion chamber is in fluid communication with the at least one burner and being in heat transfer communication with the exterior surface of the cooking vessel;
installing a baffle system within the combustion chamber; and
at least one deflector disposed at least partially within the combustion chamber to adjustably increase or decrease the volume of the combustion chamber when the deflector is opened or closed.

19. The method of claim 18, further comprising:
angling the burner inwardly toward the exterior surface of the cooking vessel.

20. The method of claim 18, further comprising:
extending the combustion chamber in a generally horizontal direction.

21. The method of claim 20, wherein the combustion chamber is extended at an upward draft angle relative to the horizontal from an inlet portion to an outlet portion.

22. The method of claim 18, wherein the combustion chamber is tapered inwardly from an inlet portion to an outlet portion.

23. The method of claim 22, wherein the inward taper is angled and linear.

24. The method of claim 22, wherein the inward taper is curved.

25. A method of cooking food, comprising:
placing a cooking medium into a cooking vessel;
heating the cooking medium with a natural draft combustion system having at least one supply conduit for receiving and distributing a combustion gas, at least one burner in fluid communication with the at least one supply conduit, and at least one combustion chamber connected along an exterior surface of the cooking vessel, such that the at least one combustion chamber is in fluid communication with the at least one burner and being in heat transfer communication with the exterior surface of the cooking vessel, and a baffle system disposed within the combustion chamber, and providing at least one deflector disposed at least partially within the combustion chamber to adjustably increase or decrease the volume of the combustion chamber when the deflector is opened or closed; and
cooking the food in the heated cooking medium.

* * * * *